United States Patent [19]

Furusawa et al.

[11] Patent Number: 5,735,028
[45] Date of Patent: Apr. 7, 1998

[54] PROCESSING APPARATUS WITH MOVABLE PROCESSING TOOL AND PROCESSING METHOD

[75] Inventors: Yoshinori Furusawa, Takarazuka; Yoshihiro Ikemoto, Hirakata; Tutomu Hamada, Hirakata; Hiroyuki Funasho, Hirakata, all of Japan

[73] Assignee: Matsushita Electric Industrial Co., Ltd., Kadoma, Japan

[21] Appl. No.: 594,784

[22] Filed: Jan. 31, 1996

Related U.S. Application Data

[63] Continuation-in-part of Ser. No. 543,918, Oct. 17, 1995, abandoned.

[30] Foreign Application Priority Data

| Oct. 19, 1994 | [JP] | Japan | 6-253275 |
| Nov. 17, 1994 | [JP] | Japan | 6-283174 |
| Jan. 31, 1995 | [JP] | Japan | 7-014115 |

[51] Int. Cl.⁶ .............. B23B 7/14; B24B 49/00; B23C 3/00; G05B 19/00
[52] U.S. Cl. .............. 29/27 R; 82/1.11; 82/118; 82/133; 364/474.37; 409/166
[58] Field of Search .............. 29/27 R, 27 C, 29/28; 82/117, 133, 118, 903, 111; 409/165, 166, 168; 73/105; 451/5; 340/870.18; 358/299; 364/474.29, 474.16, 474.01, 474.37

[56] References Cited

U.S. PATENT DOCUMENTS

| 3,681,978 | 8/1972 | Mathias et al. | 73/660 |
| 3,685,375 | 8/1972 | Hill | 82/903 X |
| 4,052,739 | 10/1977 | Wada | 358/299 |
| 4,309,702 | 1/1982 | Mibu et al. | 340/870.18 |
| 5,042,335 | 8/1991 | Ciboldi et al. | 82/117 |
| 5,315,373 | 5/1994 | Kubu et al. | 73/105 X |
| 5,361,470 | 11/1994 | Hamada et al. | 29/27 R |

FOREIGN PATENT DOCUMENTS 6-218652  8/1994  Japan.

Primary Examiner—William R. Briggs
Attorney, Agent, or Firm—Wenderoth, Lind & Ponack

[57] ABSTRACT

A processing apparatus with a movable processing tool, which includes a position detecting sensor for detecting a rotary position of a to-be-processed object held by a holding member set to a rotary main shaft, a deflection detecting sensor for detecting an amount of rotational deflection of a processing reference surface of the object, a waveform shaping device for shaping an output signal from the deflection detecting sensor into a waveform approximate to a sine curve, an operational device for operating a positional correction amount for a processing tool at a processing point of the object on a basis of an output signal of the waveform shaping device synchronously with rotation of the rotary main shaft, an output device for outputting the positional correction amount for every rotary position and every processing point based on an output signal from the operational device, a fine adjustment mechanism for minutely driving the processing tool based on an output signal from the output device, and an NC table moving in two dimensions the fine adjustment mechanism to process the object by the processing tool.

9 Claims, 10 Drawing Sheets

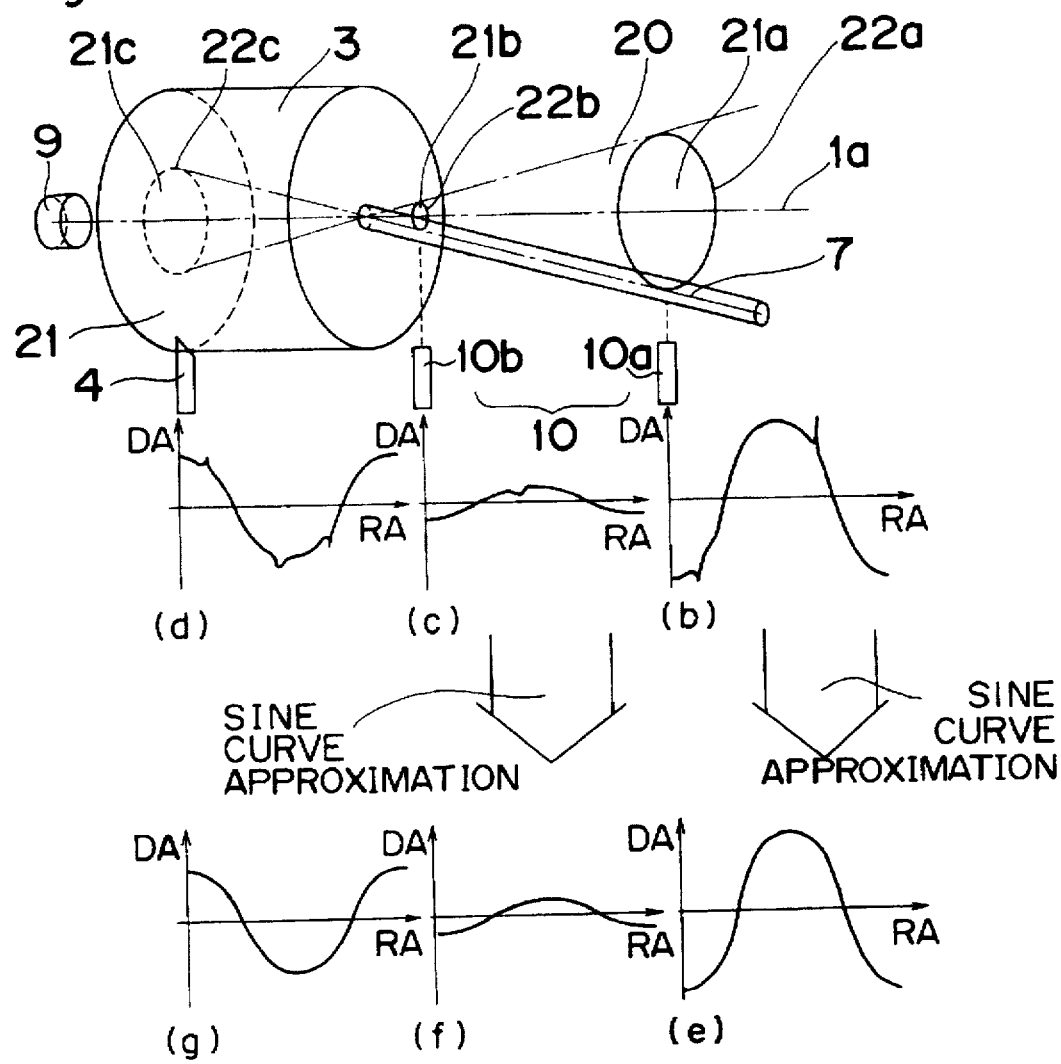

PROCESSING APPARATUS WITH MOVABLE PROCESSING TOOL AND PROCESSING METHOD

This is a Continuation-In-Part application of U.S. patent application Ser. No. 08/543,918 filed Oct. 17, 1995 and now abandoned.

BACKGROUND OF THE INVENTION

The present invention relates to a processing apparatus with a movable processing tool such as a cutting tool, a milling cutter, and a polishing or lapping tool which moves in two dimensions an NC table with the processing tool mounted thereon, and a processing method therefor.

A cutting apparatus of the aforementioned type equipped with an NC table has been widely employed for processing highly accurate parts such as VTR (video tape recorder) head cylinders, etc. A prior art cutting apparatus shown in FIG. 5 has a chuck 2 on an axis of a rotary main shaft 1 rotating in a direction of an arrow A to hold a to-be-processed object 3 by the chuck 2. The illustrated object 3 is a head cylinder of a video tape recorder having a center hole 3a formed at a central axial part thereof. Meanwhile, an NC table 5 loading a cutting tool 4 for cutting an outer peripheral surface of the object 3 is moved in two dimensions in directions of arrows B and C based on a program built in a control circuit 6. After the cutting, a shaft 7 of a different material from that of the processed head cylinder 3 is coupled at the center hole 3a by shrink fitting, pressure insertion or the like manner, as shown in FIG. 6.

What comes into issue here is, as is clear from FIG. 6, the undesirable fact that the shaft 7 coupled at the center hole 3a is easy to incline to the outer peripheral surface of the object 3 however accurately the outer peripheral surface of the object 3 is processed. Although an amount of rotational deflection of the head cylinder 3 resulting from the inclination of the shaft 7 is merely several microns, this is a high hurdle for a final product, that is, VTR. Since a magnetic head of the VTR rotates about the shaft 7 as a reference while a magnetic tape runs along the outer peripheral surface of the head cylinder 3 as a reference, it is impossible for the magnetic head to trace the magnetic tape correctly, causing deterioration of image quality of reproduced images.

The aforementioned issue is solved if the shaft 7 is coupled to the center hole 3a beforehand and the outer peripheral surface of the head cylinder 3 is cut on the basis of the preliminarily coupled shaft 7. In practicing this idea in the conventional cutting apparatus, however, the head cylinder 3 should be finely adjusted when set to the chuck 2 so as to make the inclined and coupled shaft 7 coaxial with the rotary main shaft 1. The adjustment cannot be done without manual work, hence the method is not fit for mass production.

This kind of trouble is not limited to the cutting of head cylinders. For example, it is supposed that an entire outer peripheral surface of a rod-like object 8 in FIG. 7 is processed.

In the example, one end 8b of the to-be-processed object 8 is cut while the other end 8a is held by the chuck 2. Then, the chuck 2 is switched to hold the end 8b and cut the other end 8a. At this time, the end 8a would generate a rotational deflection if without coaxial holding of the end 8b with the rotary main shaft 1 by the chuck 2.

The rotational deflection of the end 8a makes it hard to cut the total length of the object 8 with high accuracy, because the end 8a is cut based on a rotary center of the rotary main shaft 1. Although a sufficiently long distance of the end 8b is first cut which is over the other end 8a held by the chuck 2, and then the chuck 2 is switched to hold the processed end 8b in the manner similar to the aforementioned case of the inclined head cylinder, this process also requires manual work and is not suitable for mass production.

Meanwhile, the applicant has proposed the processing apparatus with the movable processing tool whereby an object can be processed with high accuracy even if a processing reference surface of the object accompanies a rotational deflection in accordance with the rotation of a rotary main shaft in U.S. Pat. No. 5,361,470. The proposed processing apparatus is assumed to measure the processing reference surface under an ideal condition, and therefore an error might be brought about depending on the measuring condition for the processing reference surface. The error might result for two reasons. One is that the processing reference surface is low in accuracy. Due to the movement of the processing tool following the rotational deflection of the processing reference surface, a flaw or dirt on the processing reference surface or, a low roundness or a low flatness of the object produces measuring errors, hence degrading processing accuracy. Another reason is related to a method of how the rotational deflection of the processing reference surface is measured. A contact-type or an electrical capacitance type distance sensor or a laser displacement sensor, etc. is not free from measuring errors because of cutting oil or dust adhering to the processing reference surface. A gap sensor of an eddy current type generates measuring errors from remanent magnetism.

SUMMARY OF THE INVENTION

The object of the present invention is therefore to provide a processing apparatus with a movable processing tool and a processing method which can detect a rotational deflection of a to-be-processed object with high accuracy thereby to process the object by means of the tool tracing the rotational deflection.

In accomplishing these and other objects, according to one aspect of the preset invention, there is provided a processing apparatus with a movable processing tool, which comprises:

a position detecting sensor for detecting a rotary position of a to-be-processed object held by a holding member set to a rotary main shaft;

a deflection detecting sensor for detecting an amount of rotational deflection of a processing reference surface of the object;

a waveform shaping device for shaping an output signal from the deflection detecting sensor into a waveform approximate to a sine curve;

an operational device for operating a positional correction amount for a processing tool at a processing point of the object on a basis of an output signal of the waveform shaping device synchronously with rotation of the rotary main shaft;

an output device for outputting the positional correction amount for every rotary position and every processing point based on an output signal from the operational device;

a fine adjustment mechanism for minutely driving the processing tool based on an output signal from the output device; and an NC table moving in two dimensions the fine adjustment mechanism to process the object by the processing tool.

According to another aspect of the present invention, there is provided a processing method using a movable processing tool, comprising steps of:

rotating a to-be-processed object;

detecting a rotary position of the object;

detecting an amount of rotational deflection of a processing reference surface of the object;

shaping a signal of the amount of the rotational deflection into a waveform approximate to a since wave;

operating a positional correction amount for a processing tool at a processing point of the object on a basis of a signal of the approximated waveform synchronously with rotation of the rotary main shaft;

outputting the operated positional correction amount for every rotary position and every processing point based on a signal of the positional correction amount;

minutely driving the processing tool based on a signal of the outputted positional correction amount by a fine adjustment mechanism; and moving the fine adjustment mechanism in two dimensions to process the object by the processing tool.

BRIEF DESCRIPTION OF THE DRAWINGS

These and other objects and features of the present invention will become clear from the following description taken in conjunction with the preferred embodiment thereof with reference to the accompanying drawings, in which:

FIG. 4 is a diagram explanatory of an operation of a waveform shaping circuit in the embodiment of the present invention;

DETAILED DESCRIPTION OF THE PREFERRED EMBODIMENT

Figure 1:
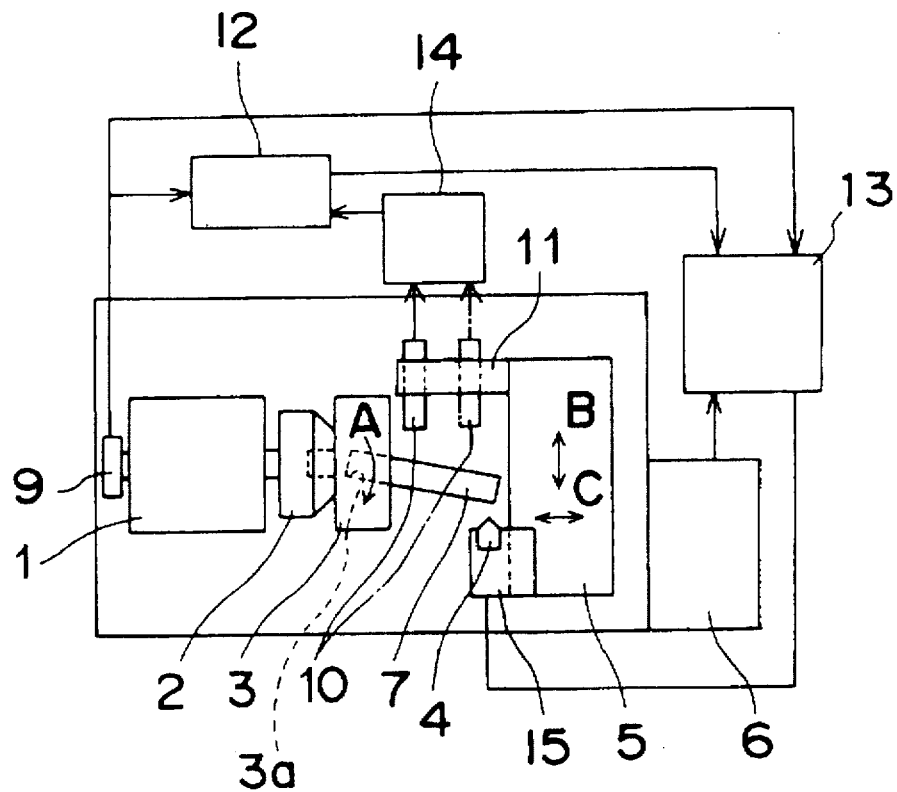
FIG. 1 is a schematic plan view of a cutting apparatus with a movable tool according to one embodiment of the present invention.

Before the description of the present invention proceeds, it is to be noted that like parts are designated by like reference numerals throughout the accompanying drawings.

Preferred embodiments of the present invention will be described below with reference to the accompanying drawings.

A cutting apparatus with a movable cutting tool type shown in FIG. 1 includes a chuck 2 set to a rotary main shaft 1, a cutting tool 4, an NC table 5, a control circuit 6, etc. A to-be-processed object 3 is held by the chuck 2. The to-be-processed object 3 is specifically a head cylinder for a video tape recorder. A shaft 7 is preliminarily coupled at a center hole 3a of the head cylinder by shrink fitting, pressure insertion or the like manner. The shaft 7 serves as a processing reference surface of the object 3. Since the shaft 7 generates a rotational deflection although the rotational deflection is small in accordance with the rotation of the rotary main shaft 1, the shaft 7 is intentionally illustrated so in an inclined state.

The present cutting apparatus is different from the conventional cutting apparatus on the following points. A sensor 9 for detecting a rotary position of the object 3 is set to the rotary main shaft 1. Moreover, a sensor 10 for detecting a rotational deflection generated in the shaft 7 subsequent to the rotation of the object 3 is movably fixed to the NC table 5 by a metal fittings 11. The sensor 10 is moved between its different measuring positions 10a, 10b described later and fixed at its respective measuring positions 10a, 10b.

A detecting output from the sensor 9 is input to an operational circuit 12 and an output circuit 13. A detecting output from the sensor 10 is input to the operational circuit 12 through a waveform shaping circuit 14. An output signal of the operational circuit 12 is input to the output circuit 13. A fine adjustment mechanism 15 moves the cutting tool 4 minutely based on an output signal from the output circuit 13.

The waveform shaping circuit 14 approximates the detecting output of the sensor 10 to a sine curve, whereby errors when the processing reference surface is measured may be reduced. Moreover, the operational circuit 12 operates a correction amount at each processing point of the object 3 for every rotary position of the object 3 based on the detecting outputs of the sensors 9 and 10.

The output circuit 13 transmits the correction amount for every processing point to the fine adjustment mechanism 15 in synchronization with the rotary position of the object 3. The fine adjustment mechanism 15 with the on-board cutting tool 4 is secured on the NC table 5.

Figure 2:
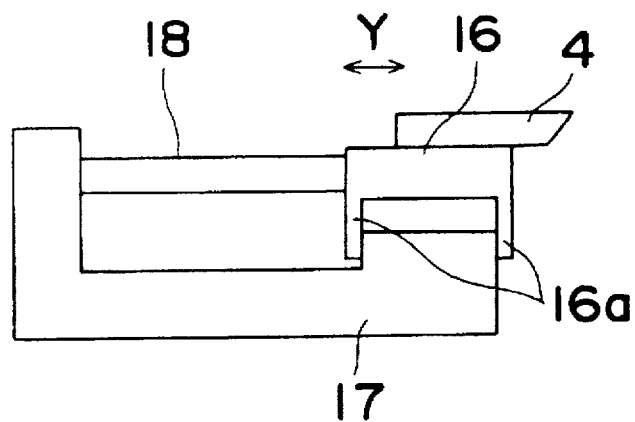
FIG. 2 is a schematic side view of a fine adjustment mechanism in the embodiment of the present invention.

As shown in FIG. 2, the fine adjustment mechanism 15 has a movable stage 16 to which the cutting tool 4 is secured by screws or the like. The movable stage 16 is fixed to a mounting stage 17 by a pair of spring parts 16a. A piezoelectric element 18 is placed between the movable stage 16 and the mounting stage 17 fixed to the NC table 5.

In the cutting apparatus constituted as above, the object 3 rotates in a direction of an arrow A in accordance with the rotation of the rotary main shaft 1, while the shaft 7 as the processing reference surface of the object 3 rotates deflecting. Before cutting, the sensor 9 detects the rotary position of the object 3 and the sensor 10 measures an amount of the rotational deflection of the shaft 7. On the other hand, the operational circuit 12 calculates, based on the detecting outputs from the sensors 9 and 10, a correction amount necessary for a surface to be processed of the object 3 correspondingly to the rotary position of the object 3.

The above operation will be more fully described with reference to FIGS. 3A and 3B.

Figure 3A:
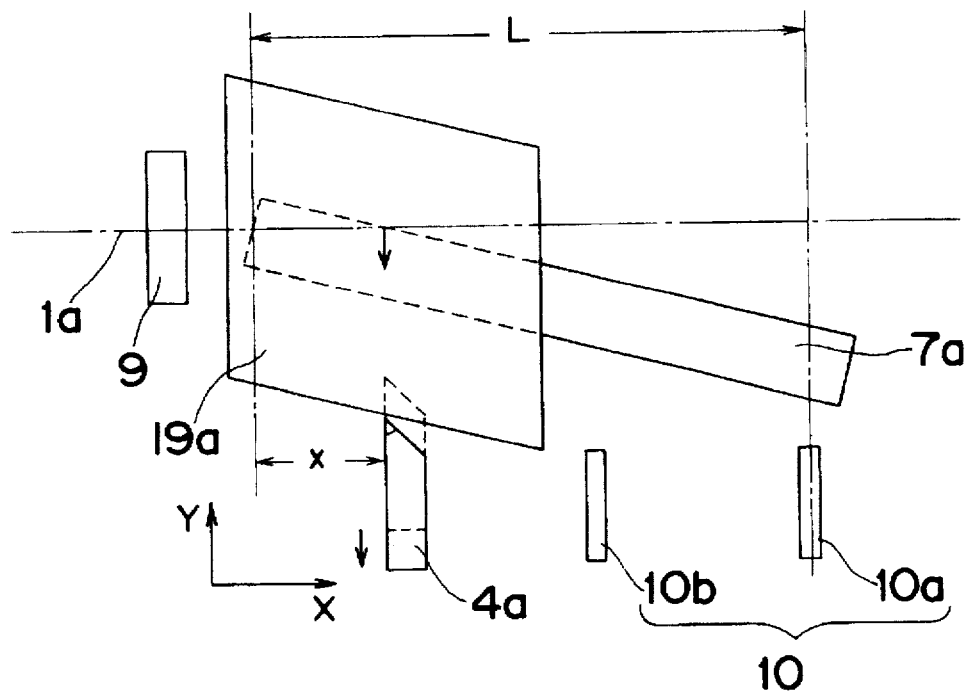
FIGS. 3A and 3B are explanatory diagrams of synchronous driving of a cutting tool in the embodiment of the present invention.
Figure 3B:
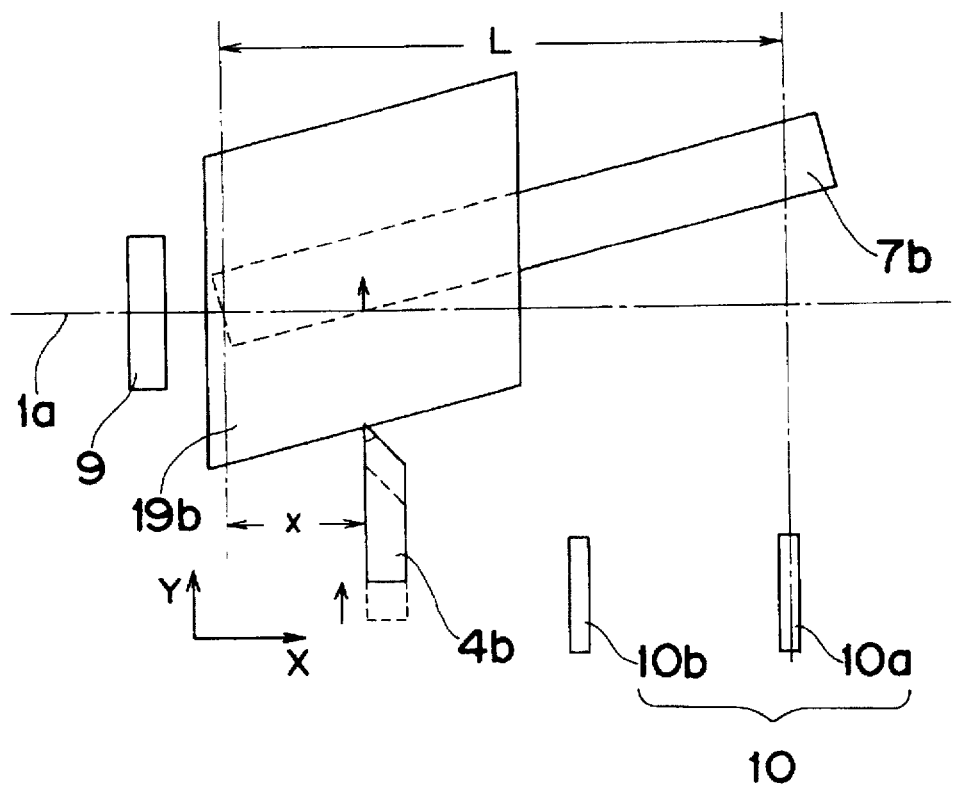
Figure 5:
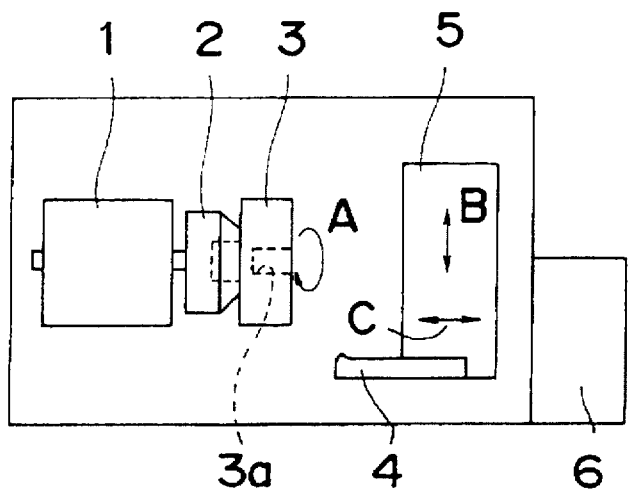
FIG. 5 is a schematic plan view of a conventional cutting apparatus with a movable cutting tool type.
Figure 6:
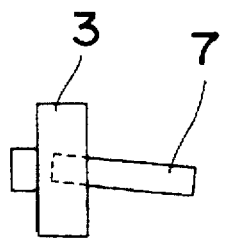
FIG. 6 is a view of a completed head cylinder as a to-be-processed article.

In FIGS. 3A and 3B, reference numerals 4a and 4b indicate the cutting tool 4 at the different positions; similarly, 10a and 10b show different measuring positions of the sensor 10; 1a a rotary center of the rotary main shaft 1; 7a and 7b the shaft 7 at the different positions; and 19a and 19b the completely processed object at the different positions. FIG. 3A shows a state where the shaft 7a is closest to the sensor 10. In FIG. 3B, the rotary main shaft is rotated 180° from the state of FIG. 3A (that is, the shaft 7b is farthest from the sensor 10.). The two states in FIGS. 3A and 3B are easily specified from a maximum distance position and a minimum distance position with the use of, e.g., an electrical capacitance type distance sensor as the sensor 10. In the meantime, the rotary position of the object 19a, 19b is detected by the sensor 9 set to the rotary main shaft 1.

A position of the shaft 7 to the rotary center 1a of the rotary main shaft 1 is calculated from the detected data of the rotational deflection so as to make a distance between the shaft 7a and cutting tool 4a equal to that between the shaft 7b and cutting tool 4b. When a surface of the object parallel to the shaft 7a is to be processed, the cutting tool 4 is minutely moved in synchronization with the deflection of the shaft 7 at the processing point, so that the cutting tool 4 and the shaft 7 are relatively maintained in a state without deflections.

In other words, when an outer peripheral surface of the object 3 is processed while the cutting tool 4 is kept in a state without any relative deflection to the shaft 7 serving as the processing reference surface, this means that the outer peripheral surface is processed based on the shaft 7. The operation can be easily performed and the operated result can be easily preserved by a commercially available personal computer.

The measuring result by the sensor 10 depends largely on the accuracy of the processing reference surface. If the correction amount for the cutting tool 4 is calculated without handling flaw on the processing reference surface or electric noises of the sensors, a roundness, a flatness or the like accuracy of the to-be-processed surface is deteriorated. In order to avoid such deterioration, the correction amount for the cutting tool 4 is calculated by shaping the measuring result into a waveform approximate to a theoretical sine curve corresponding to a theoretical expression. Why the measuring result is approximated to the sine curve will be explained with reference to FIG. 4.

In FIG. 4, (a) indicates a correlation of the cutting tool 4, to-be-processed object 3, shaft 7, position detecting sensor 9, and deflection detecting sensor 10. The shaft 7 draws a locus of a biconical surface or a part of the biconical surface when the rotary main shaft 1 of a lathe is rotated. The locus is designated by a reference numeral 20 and, a plane vertical to the rotary center 1a of the rotary main shaft 1 is represented by 21. Reference numerals 21a, 21b, 21c are planes vertical to the rotary center 1a at the measuring positions 10a, 10b of the deflection detecting sensor 10 and the position of the cutting tool 4. An intersection of the surface 20 and the plane 21 is a circle, i.e., 22a, 22b, 22c. Therefore, seen from the measuring positions 10a, 10b of the deflection detecting sensor 10, the shaft 7 moves on a circular locus, a waveform of which is detected to be a sine curve.

Now, a method for the above approximation will be described. When the deflection detecting sensor 10 detects a deflection while the position detecting sensor 9 detects the time for one rotation of the object 3, a waveform of the deflection corresponds to one cycle of the sine curve. In FIG. 4, (b) and (c) indicate the waveforms respectively measured at the measuring positions 10a, 10b of the deflection detecting sensor 10. As shown in the drawings, the measured waveform is not always an ideal sine curve, but includes errors subject to the roundness of the shaft 7 as the processing reference surface or the measuring method by the deflection detecting sensor 10. A waveform in (d) of FIG. 4 is obtained when the correction amount for the cutting tool 4 at each position is calculated by the operational circuit 12 based on signals of the waveforms of (b) or (c) in FIG. 4. The processing accuracy would be adversely influenced if the cutting tool 4 were minutely driven on the basis of the signal of the waveform of (d) in FIG. 4.

Under the circumstances, an amplitude and a phase of each measured waveform shown by (b) and (c) in FIG. 4 are detected according to a method of least squares at the waveform shaping circuit 14, thereby to obtain a signal of a waveform approximate to the sine curve. The approximated, shaped waveform is shown by (e) and (f) in FIG. 4 respectively corresponding to (b) and (c) of FIG. 4. The correction amount for the cutting tool 4 at each position is operated by the operational circuit 12 based on the signal of the approximated waveform and is eventually as shown by (g) in FIG. 4. Accordingly, when the cutting tool 4 is minutely driven based on the signal waveform of (g) in FIG. 4, the processing accuracy is controlled not to be impaired by the errors of the shaft 7. Preferably, data of the rotational deflection are recorded not for one rotation, but for an optional number of rotations so as to be utilized to obtain the approximate waveform. In the waveforms of (b) through (g), each ordinate axis indicates deflection amount (DA) and each abscissa axis indicates rotary angle (RA).

At an actual cutting time of the object 3 by the cutting tool 4, the output circuit 13 outputs the calculated correction amount for the cutting tool 4 corresponding to a position of the cutting tool 4 in an axial direction of the shaft 7 synchronously with the rotary position of the rotary main shaft 1 to the. piezoelectric element 18. The position of the cutting tool 4 in the axial direction of the shaft 7 is input from the control circuit 6 as a position of the NC table 5 to which the fine adjustment mechanism 15 with the cutting tool 4 is secured. And, a rotary position of the position detecting sensor 9 set to the rotary main shaft 1 is input as the rotary position of the object 3. As long as the above position input is clearly understood, a known controlling technique easily realizes synchronous outputting of the positional calculation results with respect to the two signals. That is, a rotational angle of the rotary main shaft 1 is detected at all times by the position detecting sensor 9, and whenever the rotary main shaft 1 rotates a predetermined angle and whenever the NC table 5 moves to change the processing point, the correction amount of the position of the cutting tool 4 is calculated and output to the fine adjustment mechanism 15.

The fine adjustment mechanism 15 minutely moves the cutting tool 4 by a predetermined amount in a direction Y of FIG. 2 based on the signal output from the circuit 13. The piezoelectric element 18 is used as a driving source to shift the cutting tool 4 in response to the signal from the output circuit 13. The piezoelectric element 18 has one end fixed to the mounting stage 17 of sufficient rigidity and the other end fixed to the movable stage 16 having the spring parts 16a. Then, when the signal from the output circuit 13 is input to the piezoelectric element 18, the piezoelectric element 18 expands/shrinks thereby deforming the spring parts 16a, consequently moving the movable stage 16 minutely. A driving voltage of the piezoelectric element 18 is generally hundreds volts showing hysteresis characteristics, and therefore it is better to feedback and control the piezoelectric element 18 so that the cutting tool 4 is shifted a predetermined amount by amplifying the signal from the output circuit 13 by an amplifier circuit and measuring a shifting amount of the movable stage 16 by a displacement sensor.

Figure 7:
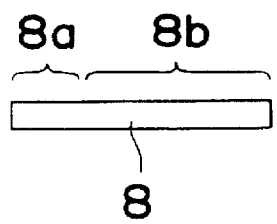
FIG. 7 is a plan view of a rod-like body as a to-be-processed article.

In the foregoing embodiment, the outer peripheral surface of the object 3 is processed based on the shaft 7. Since the amount and the center of the deflection of the shaft 7 as the processing reference surface are basically operated from the signal of the deflection detecting sensor 10 corresponding to the rotary position of the rotary main shaft 1, the correction amount may be operated in any optional direction of the object 3. Needless to say, therefore, an end face of the object 3 becomes processable based on the shaft 7 if the correction amount for the end face of the object 3 is operated similarly and a fine adjustment mechanism and a cutting tool which can be moved minutely in a direction of the correction amount are provided on the NC table. In contrast, even when the processing reference surface is not the shaft 7 of the object and if the processing reference surface measured by a deflection detecting sensor (not shown) when the rotary main shaft 1 of the lathe is rotated represents an ideal sine curve, the processing accuracy may be enhanced through approximation based on the measured sine curve. It is clearly understood that this arrangement is easily applicable also to the rod-like object described in relation to the prior art shown in FIG. 7.

While the deflection detecting sensor 10 used in the embodiment is a non-contact electrical capacitance type distance sensor, a contact-type sensor may be employed. If a position detecting sensor of the rotary main shaft 1 is incorporated in the NC cutting apparatus itself although the position detecting sensor 9 is set to the rotary main shaft 1 in the embodiment, such a position detecting sensor may be used instead of the sensor 9. Alternatively, the rotary position of the object 3 or shaft 7 may be measured directly. According to the present embodiment, it is so constructed that the operation result is once recorded and output afterwards in synchronization with the necessary correction amount. However, the correction amount may be instantaneously calculated and output based on the positions of the cutting tool 4 and rotary main shaft 1.

As is described hereinabove, the cutting tool is minutely driven synchronously with the deflection of the processing reference surface to process the object even if the processing reference surface has some deflection. Even when a shape accuracy of the processing reference surface is low or errors are generated depending on the measuring method, the cutting apparatus may exert a high cutting accuracy.

In the invention as described above, a necessary correction amount for the whole surface of the object to be processed may be calculated before processing. Particularly, an amount of rotational deflection of a processing reference surface of the object held by the chuck is detected correspondingly to a rotary position of the object, while a waveform of a signal of the detected amount of rotational deflection is approximated to a sine curve which is a theoretical curve. Accordingly, it becomes possible to obtain the correction amount with reduced measuring errors through calculations.

During processing, the correction amount corresponding to a processing point of the object (a contact point between the processing tool and the object) and the rotary position of the object is output from the output circuit. The processing tool is minutely moved by the fine adjustment mechanism driven based on the output signal from the output circuit. Accordingly, the processing tool and the processing reference surface of the object are maintained relatively in a state without deflections. When the processing of the object is conducted by the processing tool moving synchronously with the rotation of the rotary main shaft, a processing surface of the processing tool shows no rotational deflection to the processing reference surface of the object, in other words, the processing reference surface of the object is processed apparently with no rotational deflection even if the processing reference surface of the object deflects.

Further, since the measured amount of rotational deflection of the processing reference surface is approximated to a sine curve, errors related to a surface accuracy of the processing reference surface or the measuring method are decreased, thereby improving the processing accuracy for the object.

Figure 9:
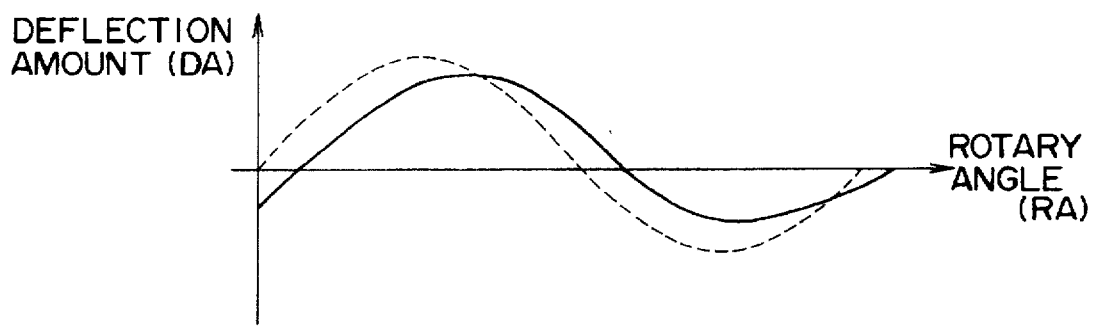
FIG. 9 is a diagram of the amount of deflection of the processing reference surface proper to the to-be-processed object.

In the first embodiment, in a case where an object is cut at a normal rotational frequency of the cutting tool, the normal rotational frequency is too high for the deflection detecting sensor 10 to correctly measure the rotational deflection of the processing reference surface, because a phase is shifted or an amount of deflection is decreased, etc. at the high rotating frequency. Supposing that a correct amount of rotational deflection represents a broken line as in a diagram of FIG. 9, the measuring result at the normal rotational frequency becomes as indicated by a solid line, whereby there is such an issue that the cutting tool might be not properly corrected in position because of the phase shift and decrease of the deflection amount. An actual rotational frequency is limited to such a value that a position of the cutting tool can be properly corrected, if the rotational frequency is controlled to be such a value, there is such an issue that a practicable rotational frequency becomes a fraction of tens of the normal rotational frequency.

A second embodiment below provides a cutting method using a movable cutting tool by which an object having a proper processing reference surface is cut based on the proper processing reference surface while rotating at high velocity without causing deflections.

Figure 12:
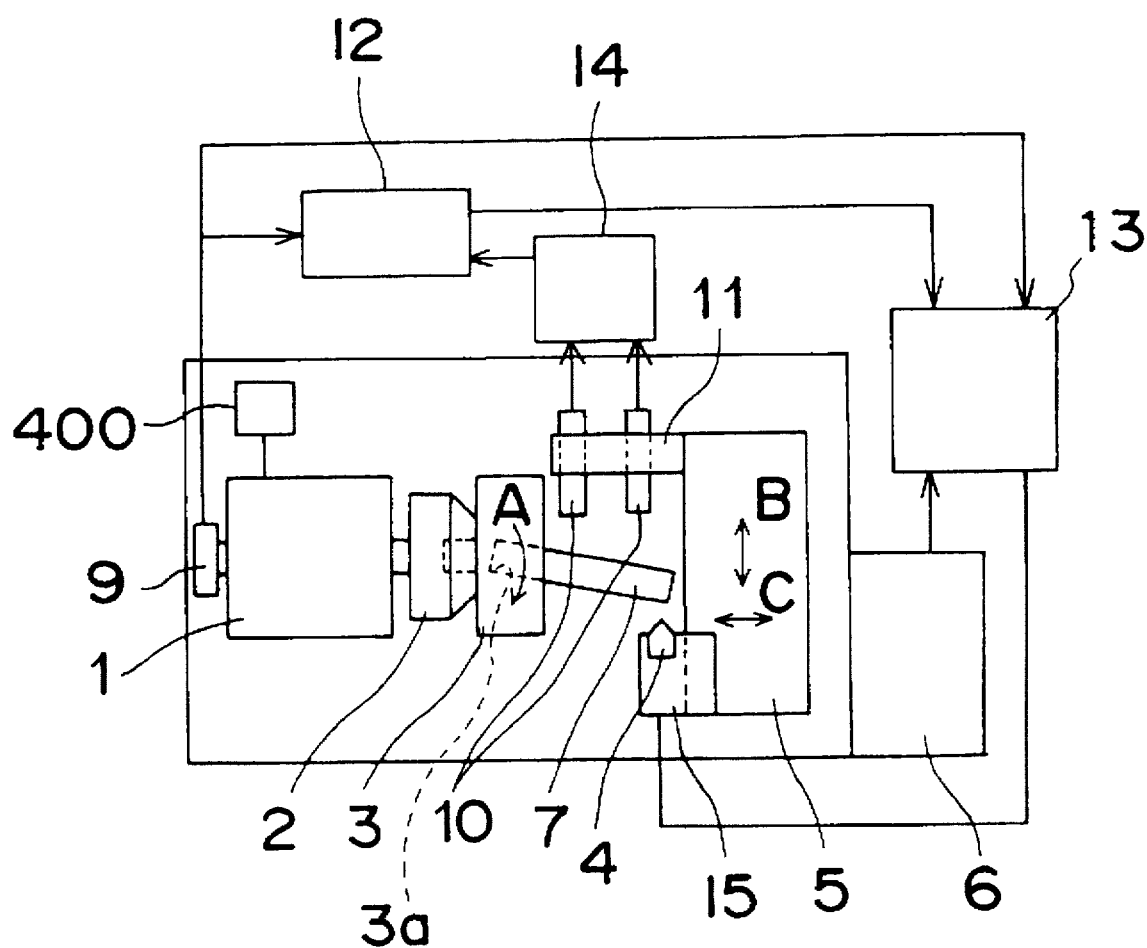
FIG. 12 is a schematic plan view of a cutting apparatus with a movable cutting tool according to another embodiment of the present invention.

That is, the feature of the second embodiment is that a rotary speed of the object at which the rotary position of the object and the amount of the deflection of the processing reference surface of the object are detected is slower than a rotary speed at which the object is processed by the processing tool under control of a main shaft rotary speed controller 400 in FIG. 12. The controller 400 may change the rotary speed of the main shaft 1.

Figure 8A:
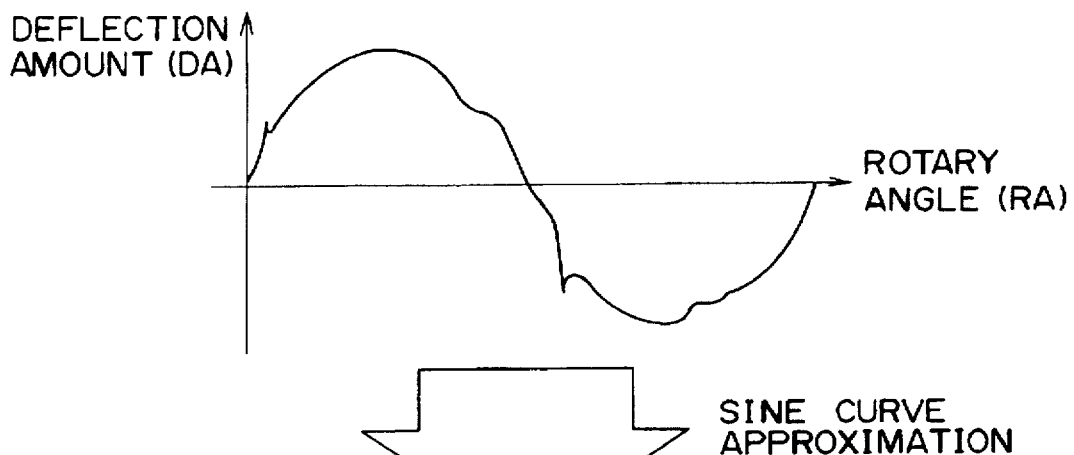
FIGS. 8A and 8B are diagrams showing how to shape an amount of deflection of a processing reference surface proper to a to-be-processed object.
Figure 8B:
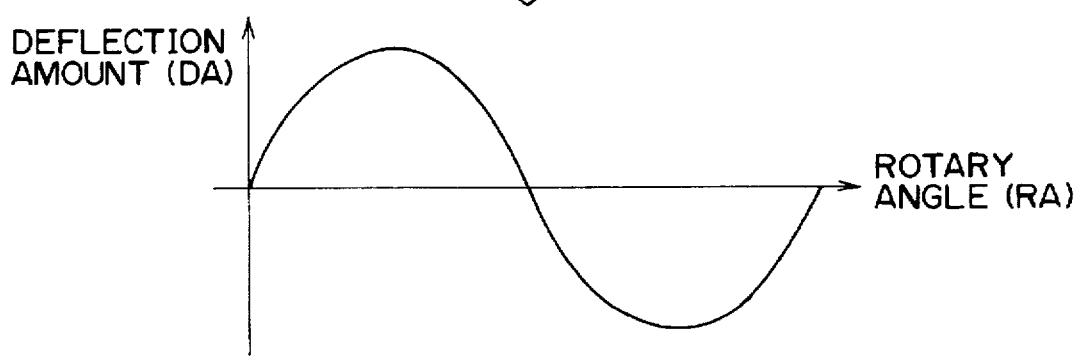

The waveform shaping circuit 14 approximates an amount of deflection shown in FIG. 8A measured by the deflection detecting sensor 10a to a sine curve, thereby reducing measuring errors in the amount of deflection as in FIG. 8B.

In this case, although a phase and a maximum value of the deflection of the shaft 7 are correctly measured because the amount of deflection of the shaft 7 is measured by the deflection detecting sensor 10a during the rotation at low speeds, an accuracy, projections and recesses or flaws on an outer peripheral surface of the shaft 7 greatly affects the measurement. Therefore, the measured waveform of the deflection amount includes the influence of the projections and recesses or flaws of the shaft 7 and errors resulting from electric noises of the deflection detecting sensor 10a, etc. as is shown in FIG. 8A. The accuracy of the object, e.g., a roundness, a flatness or the like of the object might be deteriorated if a positional correction amount for the cutting tool 4 is calculated directly on the basis of the measuring result. In order to avoid such a deterioration, the measured result is approximated for shaping to a sine curve and shaped into a waveform corresponding to the rotary angle of the object in conformity with a theoretical formula as shown in FIG. 8B. The positional correction amount for the cutting tool 4 is thus calculated by the operational circuit 12 on the basis of the shaped waveform.

The operational circuit 12 calculates the positional correction amount for the cutting tool 4a corresponding to the rotary angle of the cylinder 19a based on the measuring result obtained by the position detecting sensor (e.g. rotary angle detecting sensor) 9 and deflection detecting sensor 10a, 10b. The operation will be discussed in detail with reference to FIGS. 3A and 3B.

For the convenience of understanding, only the cutting tool 4 (4a, 4b), cylinder 19 (19a, 19b) as the object, shaft 7 (7a, 7b), position detecting sensor 9 and rotary center 1a of the rotary main shaft 1 are shown in FIGS. 3A and 3B. The cylinder 19 is illustrated in a shape after being processed and the shaft 7 is shown longer than the actual length with the exaggerated deflection. FIG. 3A shows a state where the shaft 7a is closest to the deflection detecting sensor 10a, 10b. On the other hand, FIG. 3B represents a state where the shaft 7b is rotated 180° from the state of FIG. 3A to be farthest from the deflection detecting sensor 10a, 10b. The deflection detecting sensor 10a, 10b may be any of a contact-type position sensor, an electrical capacitance type distance sensor, or the deflection of the shaft 7 may be detected in a combination with the position of the cylinder 19 detected by the position detecting sensor 9 so long as the position of the shaft 7 is detected in a shape of a sine curve. An electrical capacitance distance sensor is used as the deflection detecting sensor 10a, 10b in FIGS. 3A and 3B. The obtained sine curve is shaped by the waveform shaping circuit 14 before being used.

In order to process an outer peripheral surface of the cylinder 19 without deflections to the outer peripheral surface of the shaft 7, an amount of deflection of the outer peripheral surface of the cylinder 19 is calculated from the measured amount of deflection of the shaft 7 and the position of the cylinder 19, so that the positional correction amount for the cutting tool 4 to trace the deflection amount of the to-be-processed surface, i.e., outer peripheral surface of the cylinder 19 is obtained to correct the position of the cutting tool 4.

When the amount of deflection of the outer peripheral surface of the cylinder 19 is to be calculated in the second embodiment, for the purpose of simplification of the calculation, the detected shaped waveform of the sine curve of FIG. 8B is used thereby to set, e.g., an amount of deflection $\Delta Y(\theta)$ in a Y direction of the shaft 7 as the processing reference surface at a position, for example, L of the deflection detecting sensor 10a correspondingly to each rotary angle $\theta$ of the cylinder 19, and stored in a memory means (not shown) beforehand.

Then, in order to move the cutting tool 4 correspondingly to the amount of deflection of the to-be-processed surface of the cylinder 19, an amount of deflection $\Delta y(\theta)$ at a position x of the to-be-processed surface of the cylinder 19 to the rotary center 1a of the rotary main shaft 1 is calculated according to an expression (1) below while the cutting tool 4 is moved in an X direction. The operation result made corresponding to the rotary angle of the cylinder 19 is transmitted to the output circuit 13.

$$\Delta y(\theta) = \Delta Y(\theta) \times (x/L) \tag{1}$$

The cutting tool 4 is positionally corrected in the Y direction by the output circuit 13, control circuit 6 and fine adjustment mechanism 15 as described below. At the same time, the cutting tool 4 is moved by the NC table 5 in the X direction. As a result, the outer peripheral surface of the cylinder 19 may be coaxially processed without deflections to the outer peripheral surface of the shaft 7.

The output circuit 13 outputs the positional correction amount for the cutting tool 4 to the fine adjustment mechanism 15 correspondingly to the rotary angle of the cylinder 19 when the cylinder 19 is processed by the cutting tool 4.

In an example of the second embodiment, the electrical capacitance distance sensor is employed as the deflection detecting sensor 10a, 10b and used at 80 rpm, and the cutting tool 4 is driven at 3000 rpm which is suitable for cutting.

In the above second embodiment, the outer peripheral surface of the cylinder 19 is processed with respect to the outer peripheral surface of the shaft 7 as a reference. If a positional correction amount for the cutting tool 4 to an end face of the cylinder 19 vertical to the rotational central axis of the shaft 7 is calculated from the amount of deflection of the shaft 7 in FIGS. 3A and 3B and the or another fine adjustment mechanism 15 for finely moving the cutting tool 4 in a direction of the calculated correction amount is provided in the NC table 5, the end face of the cylinder 19 can be processed based on the outer peripheral surface of the shaft 7 with no deflections to the shaft 7. Needless to say, any optional surface can be treated likewise without deflections to the shaft 7. Such an optional surface processing mechanism is described as examples in U.S. Pat. No. 5,361,470.

Moreover, although the position detecting sensor 9 is set in the rotary main shaft 1 in the above second embodiment, if an angle detecting sensor for the rotary main shaft 1 is incorporated in the NC cutting apparatus itself which is the cutting apparatus, the position detecting sensor may be used also as the position detecting sensor 9. Or, each rotary angle of the cylinder 19 and the shaft 7 may be measured directly.

The amount $\Delta Y(\theta)$ of deflection of the shaft 7 in the Y direction corresponding to each value of the rotary angle $\theta$ of the cylinder 19 is stored in the memory means in the second embodiment. Alternatively, both a maximum amount of deflection A of the shaft 7 and a rotary angle $\theta_0$ of the cylinder 19 at the time may be stored to calculate the positional correction amount $\Delta y(\theta)$ for the cutting tool 4 correspondingly to the rotary angle of the cylinder 19 according to an expression (2).

$$\Delta y(\theta, x) = A \sin(\theta - \theta_0 + \pi/2) \times (x/L) \tag{2}$$

According to the second embodiment, in a case where a processing reference surface proper to a to-be-processed object deflects subsequent to the rotation of the main shaft of the cutting apparatus, a positional correction amount for the cutting tool is detected while the main shaft of the cutting apparatus rotates at low speeds. Therefore, the positional correction amount can be correctly detected. By using the thus-detected positional correction amount, the object can be cut during high speed rotation with high accuracy and high efficiency without deflections to the processing reference surface.

If the processing reference surface proper to the to-be-processed object held by the chuck of the main shaft of the cutting apparatus is deflected subsequent to the rotation of the main shaft of the apparatus, according to the cutting method of the embodiment, the rotary angle of the to-be-processed object and the amount of deflection of the processing reference surface of the object due to the rotation of the main shaft are measured during the low-speed rotation of the main shaft, then an amount of deflection of a to-be-processed surface of the object is calculated from the measured results, and a positional correction amount for the cutting tool to conform to the operated amount of deflection of the to-be-processed surface is calculated so that the processed surface shows no deflection to the processing reference surface.

Since the main shaft is rotated at low speeds in this case, the sensors for measuring the amount of deflection of the processing reference surface are allowed to drive at low speeds, whereby the amount of deflection of the processing reference surface is correctly measured. A correct positional correction amount for the cutting tool is eventually obtained.

Since both the rotary angle of the to-be-processed object and the amount of deflection of the processing reference surface of the object resulting from the rotation of the main shaft are utilized thereby to calculate the amount of deflection of the to-be-processed surface of the object, such positional correction amount for the cutting tool as to follow the amount of deflection of the to-be-processed surface of the object is obtained. Accordingly, the processed surface shows no deflection to the processing reference surface.

The cutting tool is corrected on the basis of the positional correction amount in synchronism with the rotation of the main shaft while the main shaft is rotated at high velocity which is higher than the low speed.

Owing to the high-speed rotation of the main shaft, the object is cut at high speeds and moreover, processing errors as a result of the deflection of the processing reference surface of the object are properly corrected. Accordingly, the processed surface shows no deflection to the processing reference surface.

In a third embodiment of the present invention, an amount of deflection of the axial center of the main shaft is previously detected and the detected amount of the deflection is removed from the detected amount of the deflection of the processing reference surface of the object to more accurately process the object by the cutting tool 4.

Figure 10:
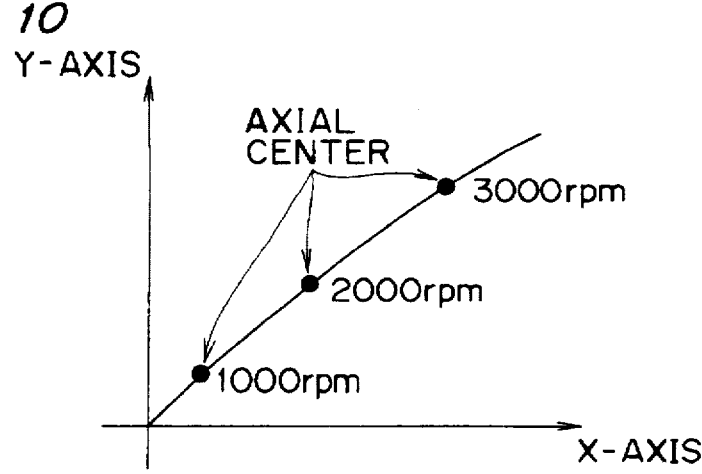
FIG. 10 is a graph showing change of the axial center of the main shaft depending on rotational frequencies of the main shaft.

That is, generally, there is a difference between response speeds of the deflection detecting sensor 10 and the fine adjustment mechanism 15. Thus, the rotational frequency of the main shaft 1 at the detecting time might be different from that at the processing time. And the axial center of the main shaft 1 is physically changed in a normal lathe, depending on rotational frequencies of the main shaft 1 as shown in FIG. 10. From FIG. 10, it is clearly understood that the axial centers are changed depending on the rotational frequencies of 1000, 2000, and 3000 rpm with respect to the X and Y coordinates. This means that the deflection of the reference processing surface of the object at the detecting time is different from that at the processing time. Therefore, the greater the change of the axial center of the main shaft 1 becomes, the worse the processing accuracy becomes.

Figure 11A:
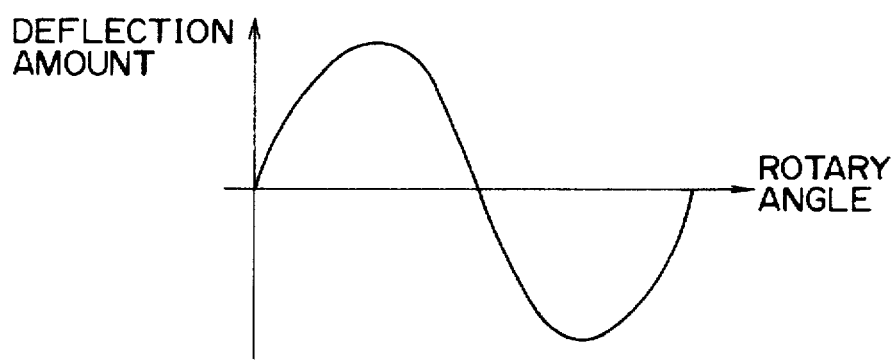
FIGS. 11A, 11B, and 11C are respectively graphs showing waveforms indicating deflection of the reference processing surface of the object detected by a deflection detecting sensor, change of the axial center of the main shaft, and deflection after an amount of the change of the axial center in FIG. 11B is removed from an amount of the deflection in FIG. 11A.
Figure 11B:
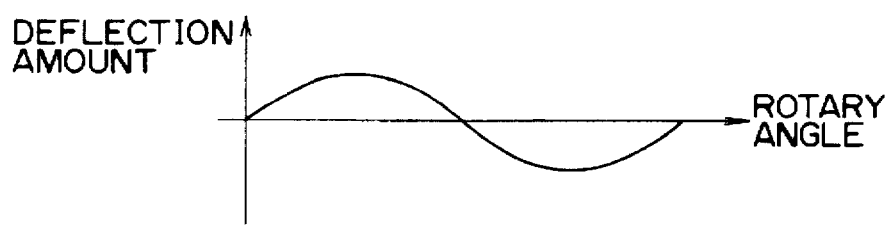
Figure 11C:
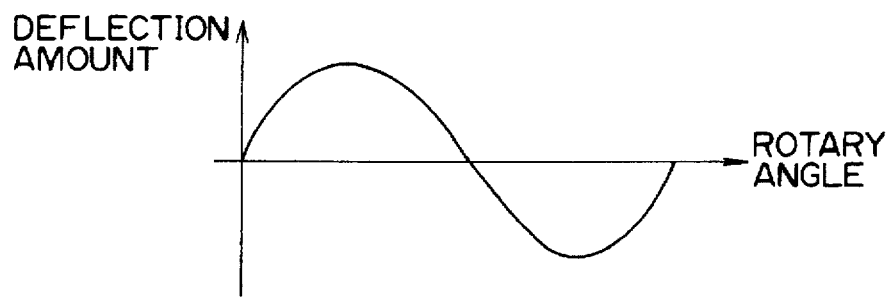

In order to avoid such deterioration of the accuracy, the change of the axial center of the main shaft 1 is previously detected by the deflection detecting sensor 10 as shown in FIG. 11B before the detecting and processing operations, and the detected amount of the axial center change in FIG. 11B is removed by the operational circuit 13 from the deflection amount in FIG. 11A of the reference processing surface detected by the deflection detecting sensor 10 as an offset amount for every detection of the reference processing surface, so as to accurately calculate the correction amount as shown in FIG. 11C. Thus, the processing accuracy may be improved in correspondence with the change of the axial center of the main shaft 1. It is unnecessary to re-detect the change of the axial center unless a balance correction of the main shaft is carried out.

Although the deflection detecting sensor 10 is constituted by a single sensor in the embodiments, two deflection detecting sensors 10 may be located at the measuring positions 10a and 10b as shown in FIG. 12 without moving the single sensor 10 at the different measuring positions 10a and 10b.

A further embodiment of the present invention is described below.

Figure 13A:
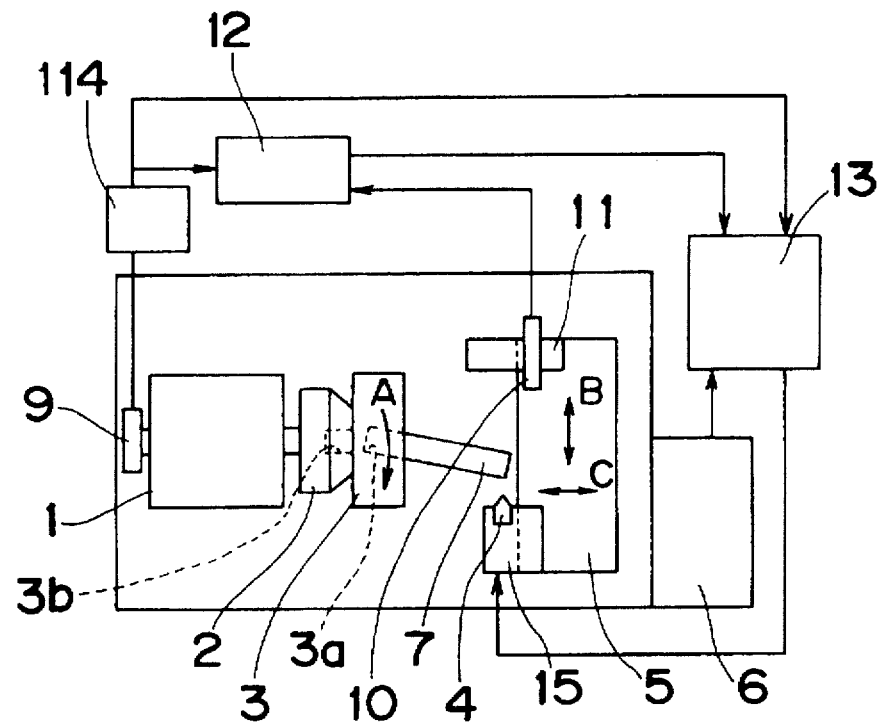
FIG. 13A is a plan view showing the construction of a cutting apparatus with a movable cutting tool according to a further embodiment of the present invention.
Figure 13B:
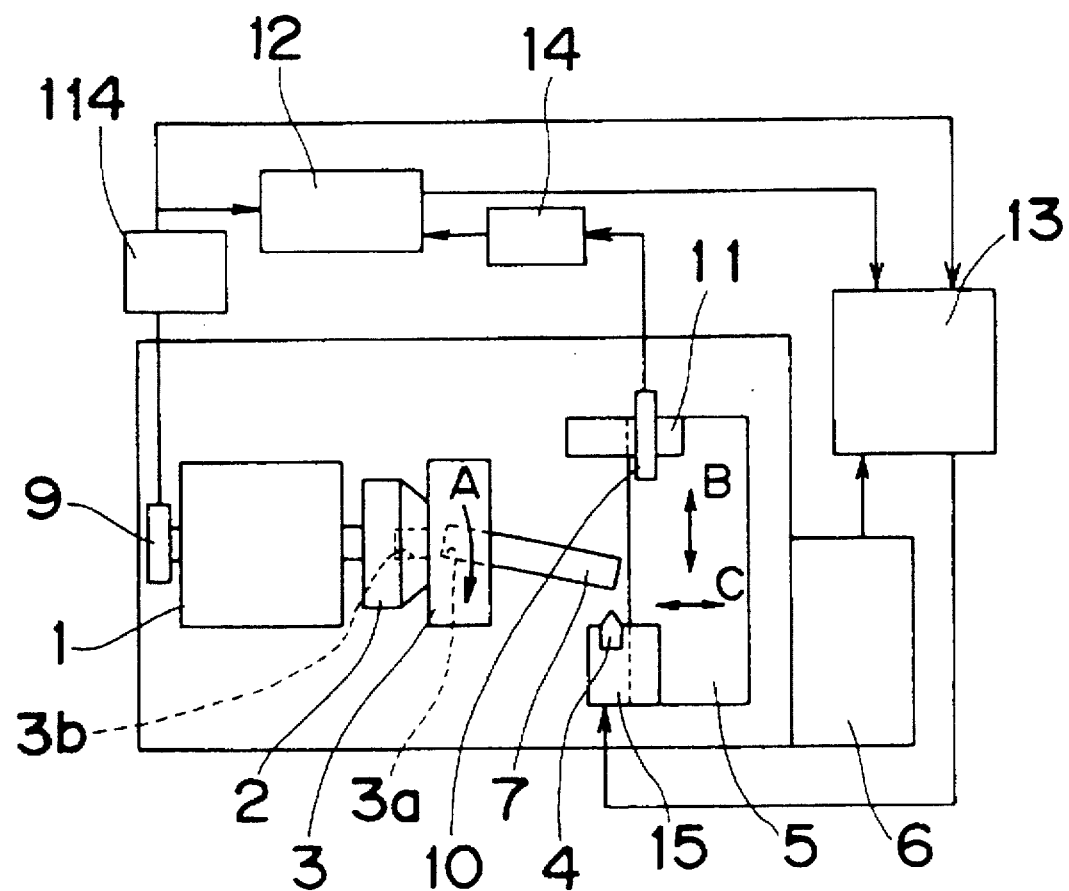
FIG. 13B is a plan view showing an example wherein the embodiment of FIG. 13A is applied to the embodiment of FIG. 1.

FIG. 13A shows a cutting apparatus with a movable cutting tool according to the further embodiment of the present invention wherein a frequency dividing circuit 114 is added to the above-described embodiments. FIG. 13B is a plan view showing an example wherein the embodiment of FIG. 13A is applied to the embodiment of FIG. 1.

An output signal of the rotary position detecting sensor (e.g. rotary angle detecting sensor) 9 is entered into the operational circuit 12 and the output circuit 13 via a frequency dividing circuit (frequency demultiplier circuit) 114. An output signal of the deflection detecting sensor 10 is inputted into the operational circuit 12. Then an output signal of the operational circuit 12 is inputted into the output circuit 13 so that a fine adjustment mechanism 15 minutely moves the cutting tool 4 according to the output signal of the output circuit 13.

The output circuit 13 transmits a correction amount for each processing point to the fine adjustment mechanism 15 in synchronization with the frequency-divided rotary angle signal of the object 3.

In the principal operation of the present embodiment, when the object 3 rotates in the direction of the arrow A along with the rotation of the main shaft 1 so that the shaft 7 serving as a processing reference surface of the object 3 rotates while deflects, the rotary angle detecting sensor 9 detects a rotary angle of the object 3 and the deflection detecting sensor 10 detects a rotational deflection amount of the shaft 7 prior to the cutting process. Then, the output signal of the rotary position detecting sensor 9 is transmitted to the operational circuit 12 and the output circuit 13 via the frequency dividing circuit 114. The operational circuit 12 calculates a cutting-tool position correction amount for the cutting tool 4 needed to process the object 3 without deflections in response to the rotary angle signal according to the output signals from both sensors 9 and 10.

Details of the above description will now be explained with reference to FIGS. 3A and 3B.

Referring to FIGS. 3A and 3B, the position of the cutting tool 4 is denoted by reference numerals 4a, 4b. The measuring position of the deflection detecting sensor 10 is denoted by 10a, 10b. The rotational center axis of the main shaft 1 is denoted by 1a. The position of the shaft 7 is denoted by 7a, 7b. The object that has been finished being machined is denoted by 19a, 19b. FIG. 3A shows the state in which the shaft 7a has come closet to the deflection detecting sensor 10. FIG. 3B shows the state in which the main shaft 1 has rotated 180 degrees from the state of FIG. 3A, i.e., the state in which the shaft 7b is the furest from the deflection detecting sensor 10. When, for example, an electrical capacitance type distance sensor is used as the deflection detecting sensor 10, the two states shown in FIGS. 3A and 3B can be easily specified from the maximum position and the minimum position of the detected distance.

Then, when the cutting tool 4 is correctively minutely moved with the aforementioned cutting-tool position correction amount so that an interval between the shaft 7a and the cutting tool 4a becomes equal to an interval between the shaft 7b and the cutting tool 4b, the outer circumferential surface of the object 3 that has been finished being machined comes to a coaxial state with the shaft 7 that serves as the processing reference surface. Accordingly, the operational circuit 12 calculates the deflection amount of each position of the shaft 7 in the lengthwise direction with respect to the rotary center axis 1a of the main shaft 1, from the rotational deflection amount detected by the deflection detecting sensor 10, and calculates the cutting-tool position correction amount in accordance with the calculated deflection amount. Then, the cutting tool 4 is then correctively minutely moved in accordance with the cutting-tool position correction amount. Thus, cutting work free from deflections with respect to the shaft 7 serving as a processing reference surface is realized. The calculation is a simple proportional calculation so that the calculating operation and the storage of calculation result can be easily implemented with a general personal computer.

Since the deflection amount with respect to the cutting tool 4 of the shaft 7 serving as the processing reference surface forms a sine curve, the cutting-tool position correction amount for minutely moving and correcting the cutting tool 4 needs to be outputted from the output circuit 13 while the cutting tool 4 is synchronized with the rotary angle signal of the object 3. If the timing of output from the output circuit 13 is delayed, the fine movement correction cycle of the cutting tool 4 would be delayed to the cycle of the rotational deflection of the shaft 7 so as to come off synchronization therewith, in which case proper cutting work could no longer be performed.

The timing of output from the output circuit 13 may be delayed in the following cases.

The cutting-tool position correction amount is calculated in the operational circuit 12 responsive to the output signals of the rotary angle detecting sensor 9. Accordingly, when the operational circuit 12 calculates the deflection amount of each position of the shaft 7 in the lengthwise direction with respect to the rotational center axis 1a of the main shaft 1 in accordance with the normal output frequency of the output signals of the sensor 9, the calculation amount becomes too large with the result that the timing of the calculation result output is delayed from the appropriate timing for positional correction of the cutting tool 4.

Further, since the output circuit 13 produces outputs in accordance with the output frequency (output number) of the output signals of the rotary angle detecting sensor 9, the output amount from the output circuit 13 becomes too large when the output circuit 13 produces outputs in accordance with the normal output frequency of the output signals of the rotary angle detecting sensor 9. As a result, the output timing would be delayed from the appropriate timing for positional correction of the cutting tool 4.

In this case, since the deflection amount of the shaft 7 will not change from the beginning to the end of the cutting process with respect to the same object 3, the issue of the calculation delay can be eliminated if the calculation result of the operational circuit 12 is stored and used. However, in the prior art, the delay of the output circuit 13 could be handled only by decreasing the number of revolutions of the main shaft 1 to decrease the output frequency.

In contrast, in the present embodiment, while the number of revolutions of the main shaft 1 is kept unchanged, the output frequency of rotary angle signals can be decreased. The method for decreasing the output frequency of rotary angle signals will be explained with reference to FIGS. 14 and 15.

Figure 14:
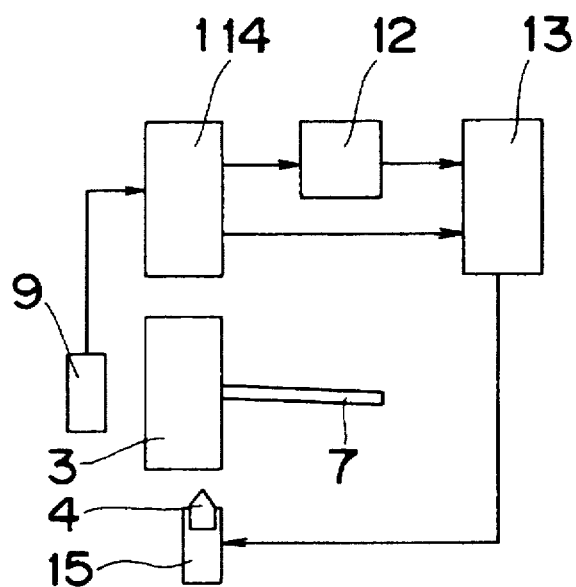
FIG. 14 is a view showing a part in the embodiment of the present invention in FIG. 13.

FIG. 14 shows the relationships among the object 3, the shaft 7, the rotary angle detecting sensor 9, the frequency dividing circuit 114, the operational circuit 12, the output circuit 13, the fine mechanism 15, and the cutting tool 4, as it is extracted from FIGS. 13A, 13B.

The frequency dividing circuit 114 is a circuit which divides the output frequency of the rotary angle signals of the rotary angle detecting sensor 9 that detects the rotary angle of the object 3 so that the rotary angle signal output frequency per rotation of the object 3 is decreased.

Figure 15:
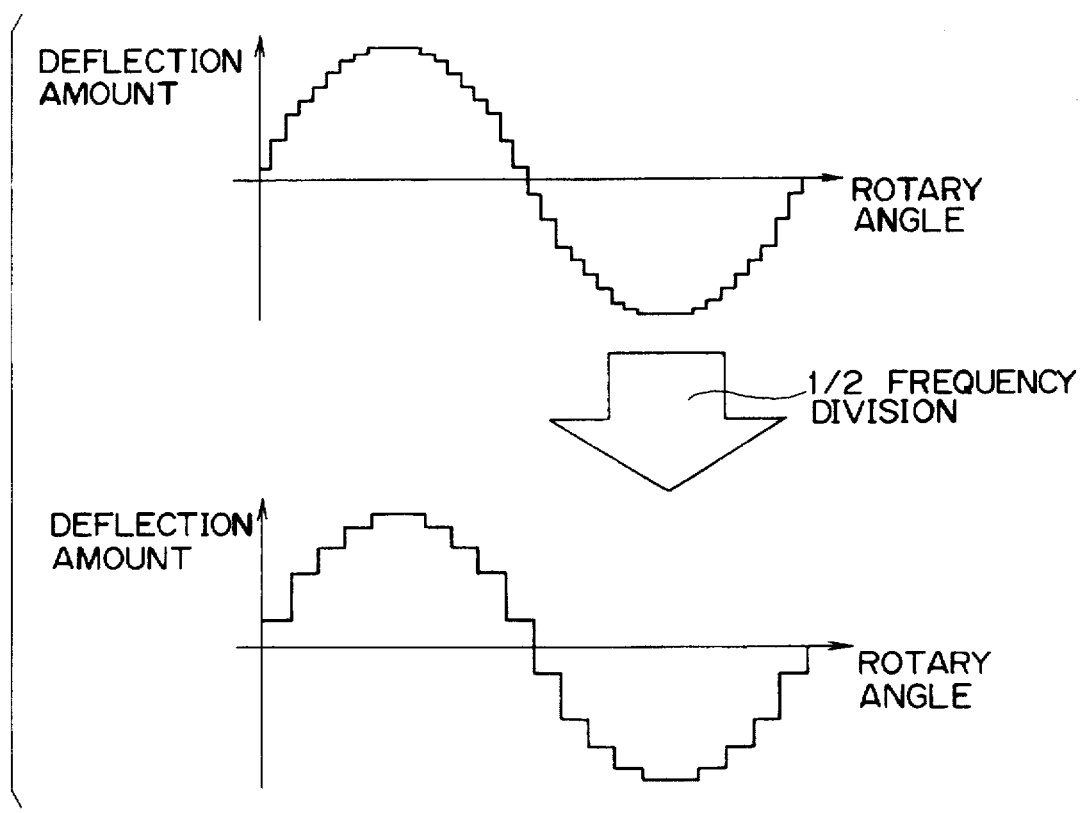
FIG. 15 is a view showing a frequency division of a rotary angle signal of the main shaft according to the present invention.

The operation of the frequency dividing circuit 114 will now be explained with reference to FIG. 15. FIG. 15 shows a measured waveform of the deflection of the shaft 7 resulting when a rotary encoder for outputting 40 pulse signals per rotation is used as the rotary angle detecting sensor 9 and the frequency dividing circuit 114 is not used, and another measured waveform of the deflection of the shaft 7 resulting when the frequency dividing circuit 114 having a frequency dividing ratio of ½ is used. Actually, the output frequency of the rotary encoder per rotation is much larger, but 40 pulses and 20 pulses are used as the output frequency of the rotary encoder for simplicity.

As described above, since the deflection amount of the shaft 7 serving as a processing reference surface forms a sine curve, the purpose of preventing the deflection can be attained if the rotation of the main shaft 1 is synchronized with the output of the cutting-tool position correction amount. The number of divisions in FIG. 15, how large or small it is, is independent of deflection but a matter of machining precision. Since the machining precision is not required to be heightened more than necessary, deflection prevention and high-speed cutting process can be achieved at the same time if the frequency division ratio of the frequency dividing circuit 114 is so set that the rotation of the main shaft 1 is synchronized with the output of the cutting-tool position correction amount.

Therefore, when the frequency division ratio is increased within the permissible range for machining precision, such as the circularity and surface roughness, with the frequency division ratio of the frequency dividing circuit 114 changed to ½, ¼, ⅛ and so on, the number of pulses of the rotary encoder to be inputted to the operational circuit 12 and the output circuit 13 can be decreased while the main shaft 1 is maintained rotating at high speed, so that the object can be machined with a proper machining precision. For example, when the rotary speed of the object is 2,000 rpm, the frequency division ratio of the frequency dividing circuit 114 is 1/2 to 1/4 preferably.

Next, the operation of the present embodiment will be explained with reference to FIGS. 13 through 15.

As shown in FIGS. 13A and 13B, the grip portion 3b of the object 3 is gripped by the chuck 2, and the control circuit 6 makes the cutting tool 4 move in the direction of the arrows B and C according to NC data that involves no rotational deflection of the shaft 7 on the NC table 5. The rotary angle detecting sensor 9 detects the rotary angle of the object 3 and outputs a signal. The frequency dividing circuit 114 frequency-divides the rotary angle signal output of the rotary angle detecting sensor 9 and then transmits the output to the operational circuit 12 and the output circuit 13. The deflection detecting sensor 10 detects the rotational deflection of the shaft 7 and transmits it to the operational circuit 12. The operational circuit 12 calculates the cutting-tool position correction amount for the cutting tool 4 and transmits the amount to the output circuit 13, each time it receives an output signal from the frequency dividing circuit 114, i.e., each time the main shaft 1 rotates to a certain angle. The output circuit 13 outputs to the fine adjustment mechanism 15 a minute correction amount derived from the operational circuit 12, i.e., a voltage corresponding to the cutting-tool position correction amount in accordance with the rotary angle of the main shaft 1, each time the output circuit 13 receives an output signal from the frequency dividing circuit 114, i.e., each time the main shaft 1 rotates to a certain angle.

The other operations are the same as the previous embodiments.

The processing method and apparatus therefor according to the present invention have an advantage that even when the processing reference surface unique to the object is deflected due to the rotation of the main shaft, the object can be machined by referencing the processing reference surface.

Further, the present invention also has an advantage in that decreasing the cutting-tool position correction signal amount in accordance with the machining precision demanded for the object allows the object to be machined at high speed with proper precision.

In the processing method and apparatus according to the embodiment of the present invention, the object having a unique reference surface is gripped by the chuck of the rotary main shaft of the apparatus, wherein when the processing reference surface is deflected due to rotation of the main shaft, the rotary angle detecting sensor detects a rotary angle of the object due to rotation of the main shaft to output a rotary angle signal, and the frequency dividing circuit frequency-divides the rotary angle signal to decrease the number of rotary angle signals per rotation of the object. Therefore, the operating speed at which the operational circuit performs a calculation in response to the rotary angle signal, and the output speed at which the output circuit delivers an output in response to the rotary angle signal become higher than necessary, so that the high-speed rotation of the main shaft can be sufficiently tracked. Thus, the processing process can be achieved at high speed.

The deflection detecting sensor detects a rotational deflection amount of the processing reference surface which the object has. The operational circuit corrects a processing tool position in response to the rotational deflection amount of the processing reference surface, and calculates a processing tool position correction amount which prevents a machined surface from being deflected with respect to the processing reference surface in synchronization with the frequency-divided rotary angle signal to output the processing tool position correction amount. The output circuit outputs a processing tool position correction signal in synchronization with the frequency-divided rotary angle signal based on the output of the processing tool position correction amount derived from the operational circuit. Further, the fine adjustment mechanism minutely moves the processing tool according to the processing tool position correction signal derived from the output circuit. Therefore, when the object having a unique processing reference surface is gripped by the chuck of the main shaft of the processing apparatus and when the processing reference surface is deflected due to the rotation of the main shaft, the object can be processed without any deflection with respect to the processing reference surface unique to the object itself.

Also, the number of rotary angle signals per rotation of the object is changed by changing the frequency division ratio of the frequency dividing circuit, and the processing tool position is corrected in correspondence to the changed number of rotary angle signals, whereby the machining precision is determined. Therefore, when the frequency division ratio of the frequency dividing circuit is set in accordance with a demanded machining precision, the response speed of the piezoelectric element, the rotary speed of the object, and/or the resolving power of the sensor, etc., the object can be machined with proper precision, in accordance with the calculation capability of the operational circuit and the output capability of the output circuit, with high efficiency.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A processing apparatus with a movable processing tool, said apparatus comprising:
   a position detecting sensor for detecting a rotary position of a to-be-processed object held by a holding member positioned on a rotary main shaft;
   a deflection detecting sensor for detecting an amount of rotational deflection of a processing reference surface of the object;
   a waveform shaping device for shaping an output signal from the deflection detecting sensor into a waveform approximating a sine curve;
   an operational device for calculating a positional correction amount for a processing tool at a processing point of the object based on an output signal of the waveform shaping device synchronously with rotation of the rotary main shaft;
   an output device for outputting the positional correction amount for every rotary position and every processing point based on an output signal from the operational device;
   a fine adjustment mechanism for minutely driving the processing tool based on an output signal from the output device; and
   an NC table for moving in two dimensions the fine adjustment mechanism in order to process the object by the processing tool,
   wherein a rotary speed of the rotary main shaft at which the rotary position of the object and the amount of the deflection of the processing reference surface of the object are respectively detected by the position detecting sensor and the deflection detecting sensor is slower than a rotary speed at which the object is processed by the processing tool.

2. The processing apparatus as claimed in claim 1, wherein the deflection detecting sensor detects an amount of a change of an axial center of the main shaft, and the amount of the change is removed from the amount of the deflection before driving the fine adjustment mechanism by the operational device.

3. A processing apparatus with a movable processing tool, said apparatus comprising:

a position detecting sensor for detecting a rotary position of a to-be-processed object held by a holding member positioned on a rotary main shaft, wherein the position detecting sensor is a rotary angle detecting sensor for detecting a rotary angle of the object due to the rotation of the rotary main shaft to output a rotary angle signal indicating the rotary position of the object;

a deflection detecting sensor for detecting an amount of rotational deflection of a processing reference surface of the object;

a waveform shaping device for shaping an output signal from the deflection detecting sensor into a waveform approximating a sine curve;

an operational device for calculating a positional correction amount for a processing tool at a processing point of the object based on an output signal of the waveform shaping device synchronously with rotation of the rotary main shaft;

an output device for outputting the positional correction amount for every rotary position and every processing point based on an output signal from the operational device;

a fine adjustment mechanism for minutely driving the processing tool based on an output signal from the output device;

an NC table for moving in two dimensions the fine adjustment mechanism in order to process the object by the processing tool; and a frequency dividing device for frequency-dividing the rotary angle signal to decrease a number of rotary angle signals per rotation of the object, so that the operational device calculates the positional correction amount for the processing tool at the processing point of the object based on the output signal of the waveform shaping device synchronously with the rotation of the rotary main shaft and in synchronization with the frequency-divided rotary angle signal to output the positional correction amount to the output device, and the output device outputs the positional correction amount based on the output signal from the operational device and in synchronization with the frequency-divided rotary angle signal, the positional correction amount being used so as to correct a position of the processing tool in response to the rotational deflection amount of the processing reference surface, and to prevent a processed surface from being deflected with respect to the processing reference surface, wherein in the frequency dividing device, the number of rotary angle signals per rotation of the object is changed by changing a frequency division ratio of the frequency dividing device.

4. A processing method using a movable processing tool, the method comprising:

rotating a to-be-processed object;

detecting a rotary position of the object;

detecting an amount of rotational deflection of a processing reference surface of the object;

shaping a signal of the amount of the rotational deflection into a waveform approximating a sine wave;

calculating a position correction amount for a processing tool at a processing point of the object on a basis of a signal of the approximated waveform synchronously with rotation of the rotary main shaft;

outputting the calculated positional correction amount for every rotary position and every processing point based on a signal of the positional correction amount;

minutely driving the processing tool based on a signal of the outputted positional correction amount by a fine adjustment mechanism; and moving the fine adjustment mechanism in two dimensions to process the object by the processing tool, wherein the rotary speed of the object at which the rotary position of the object and the amount of the deflection of the processing reference surface of the object are detected is slower than a rotary speed at which the object is processed by the processing tool.

5. The processing method as claimed in claim 4, further comprising:

detecting an amount of a change of an axial center of a main shaft onto which the object is held with a holding member, and removing the amount of the change from the amount of the rotational deflection before driving the fine adjustment mechanism.

6. A processing method using a movable processing tool, the method comprising:

rotating a to-be-processed object;

detecting a rotary position of the object;

detecting an amount of rotational deflection of a processing reference surface of the object;

shaping a signal of the amount of the rotational deflection into a waveform approximate to a sine wave;

calculating a position correction amount for a processing tool at a processing point of the object based on a signal of the approximated waveform synchronously with rotation of the rotary main shaft;

outputting the calculated positional correction amount for every rotary position and every processing point based on a signal of the positional correction amount;

minutely driving the processing tool based on a signal of the outputted positional correction amount by a fine adjustment mechanism;

moving the fine adjustment mechanism in two dimensions to process the object by the processing tool;

detecting an amount of a change of an axial center of a main shaft onto which the object is held with a holding member; and removing the amount of the change from the amount of the rotational deflection before driving the fine adjustment mechanism.

7. A processing method using a movable processing tool, the method comprising:

rotating a to-be-processed object;

detecting a rotary position of the object;

detecting an amount of rotational deflection of a processing reference surface of the object;

shaping a signal of the amount of the rotational deflection into a waveform approximating a sine wave;

calculating a position correction amount for a processing tool at a processing point of the object based on a signal of the approximated waveform synchronously with rotation of the rotary main shaft;

outputting the calculated positional correction amount for every rotary position and every processing point based on a signal of the positional correction amount;

minutely driving the processing tool based on a signal of the outputted positional correction amount by a fine adjustment mechanism;

moving the fine adjustment mechanism in two dimensions to process the object by the processing tool, wherein while detecting the rotary position, a rotary angle of the object is detected based on the rotation of a rotary main shaft to output a rotary angle signal indicating the rotary position; and dividing a frequency of the rotary angle signal to decrease a number of rotary angle signals per rotation of the object, wherein:

in the calculating operation, the positional correction amount for the processing tool at the processing point of the object is calculated on the basis of the signal of the approximated waveform synchronously with the rotation of the rotary main shaft and in synchronization with the frequency-divided rotary angle signal, in the processing tool driving operation, the processing tool is minutely driven while a position of the processing tool is corrected in accordance with the positional correction amount outputted from the outputting step, and in the frequency dividing operation, the number of rotary angle signals per rotation of the object is changed by changing a frequency division ratio of a frequency dividing device for carrying out the dividing operation.

8. A processing apparatus with a movable processing tool, said apparatus comprising:

a position detecting sensor for detecting a rotary position of a to-be-processed object held by a holding member positioned on a rotary main shaft;

a deflection detecting sensor for detecting an amount of rotational deflection of a processing reference surface of the object;

a waveform shaping device for shaping an output signal from the deflection detecting sensor into a waveform approximating a sine curve;

an operational device for calculating a positional correction amount for a processing tool at a processing point of the object based on an output signal of the waveform shaping device synchronously with rotation of the rotary main shaft;

an output device for outputting the positional correction amount for every rotary position and every processing point based on an output signal from the operational device;

a fine adjustment mechanism for minutely driving the processing tool based on an output signal from the output device; and an NC table for moving in two dimensions the fine adjustment mechanism in order to process the object by the processing tool, wherein the deflection detecting sensor detects an amount of a change of an axial center of the rotary main shaft, and the amount of the change is removed from the amount of the deflection before driving the fine adjustment mechanism by the operational device.

9. A processing apparatus with a movable processing tool, said apparatus comprising:

a position detecting sensor for detecting a rotary position of a to-be-processed object held by a holding member positioned on a rotary main shaft, wherein the position detecting sensor is a rotary angle detecting sensor for detecting a rotary angle of a to-be-processed object due to the rotation of the rotary main shaft to output a rotary angle signal indicating the rotary position of the object;

a deflection detecting sensor for detecting an amount of rotational deflection of a processing reference surface of the object;

a waveform shaping device for shaping an output signal from the deflection detecting sensor into a waveform approximating a sine curve;

an operational device for calculating a positional correction amount for a processing tool at a processing point of the object based on an output signal of the waveform shaping device synchronously with rotation of the rotary main shaft;

an output device for outputting the positional correction amount for every rotary position and every processing point based on an output signal from the operational device;

a fine adjustment mechanism for minutely driving the processing tool based on an output signal from the output device;

an NC table for moving in two dimensions the fine adjustment mechanism in order to process the object by the processing tool; and a frequency dividing device for frequency-dividing the rotary angle signal to decrease a number of rotary angle signals per rotation of the object, so that the operational device calculates the positional correction amount for the processing tool at the processing point of the object based on the output signal of the waveform shaping device synchronously with the rotation of the rotary main shaft and in synchronization with the frequency-divided rotary angle signal to output the positional correction amount to the output device, and the output device outputs the positional correction amount based on the output signal from the operational device and in synchronization with the frequency-divided rotary angle signal, the positional correction amount being used so as to correct a position of the processing tool in response to the rotational deflection amount of the processing reference surface, and to prevent a processed surface from being deflected with respect to the processing reference surface, wherein the waveform shaping device is a waveform shaping circuit, the operational device is an operational circuit, the output device is an output circuit, and the frequency dividing device is a frequency dividing circuit.

* * * * *